Patented Oct. 20, 1953

2,656,345

UNITED STATES PATENT OFFICE 2,656,345

α-ARYL-9-OXODEHYDROABIETINOLS

Robert P. Jacobsen, Shrewsbury, Mass., assignor to G. D. Searle & Co., Chicago, Ill., a corporation of Illinois No Drawing. Application August 31, 1951, Serial No. 244,712

5 Claims. (Cl. 260—99)

The present invention relates to a new group of resin acid derivatives and, more particularly, to compounds derived from dehydroabietic acid in which the carboxyl group is replaced by certain other oxygenated functions. The 1,4a-dimethyl-7-isopropyl-1,2,3,4,9,10,1a,4a - octahydrophenanthrene derivatives which constitute this invention are represented by the following structural formula

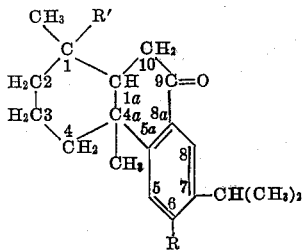

In the foregoing structural formula R is a member of the class consisting of H, —OH, —O— (lower alkyl) and —OCO— (lower alkyl) radicals. Examples of the lower alkyl groups in these alkoxy and acyloxy radicals are methyl, ethyl, n-propyl, i-propyl, n-butyl, isobutyl, sec-butyl, tert-butyl, amyl, hexyl, and the like.

The radical R' can be a lower aroyl group of the type Ar—CO— or a lower monoarylcarbinol group of the type Ar—CH(OH)—. Examples of such lower aryl radicals are substituted or unsubstituted phenyl, including o-, m-, and p-tolyl, xylyl, naphthyl and the like, unsubstituted phenyl being preferred.

The compounds which constitute my invention are valuable as intermediates in chemical synthesis as appears from the examples. They are of medicinal value, especially in the treatment of ovarian hormonal dysfunctions.

In the preparation of the compounds claimed in this application I prefer to use as the starting material the ketones of the structural formula

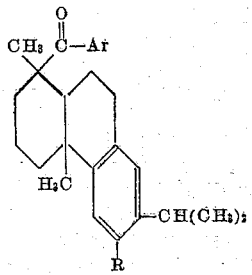

These are prepared from the corresponding abietyl halides by reaction with the arylcadmium compounds. In the case of the 6-hydroxy derivatives it is necessary to protect this radical by etherification or esterification. The ketones of the above formula are then oxidized with chromic acid, suitably in strong acetic acid solution.

Carbinols of the type

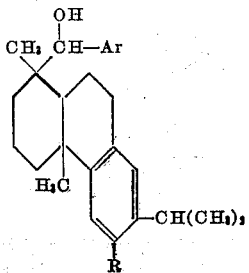

are obtained from the corresponding 1-aroyl derivatives by treatment with a reducing agent such as aluminum isopropoxide, lithium aluminum hydride or hydrogen in the presence of a suitable catalyst. It will appear that the α-carbon atom is asymmetrical and the two epimeric modifications can be isolated as shown in the examples below. These carbinols, in the form of acetates or other lower esters, are conveniently oxidized by chromic acid to the α-arylabietinols of the structural formula

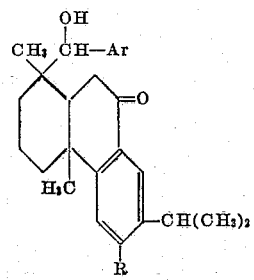

My invention will appear more fully from the following examples. It should be understood, however, that these examples are given by way of illustration only and that the invention is not to be construed as limited in spirit or in scope by the details set forth. It will be apparent to those skilled in the art that many modifications in materials and methods can be made without departing from the scope of the invention. In each of these examples temperatures are given uncorrected in degrees centigrade (°C.), pressures during vacuum distillation in millimeters (mm.) of mercury and quantities in grams (g.) and milliliters (ml.).

Example 1

Crude dehydroabietyl chloride is prepared by dissolving 150 g. of dehydroabietic acid (dried at 100° C., melting at 172–172.5° C.) in 150 ml. of thionyl chloride and heating the solution for 2 hours at 30–35° C. under nitrogen. Following distillation of the excess thionyl chloride under diminished pressure, the viscous residue is diluted with 200 ml. of toluene and the distillation repeated. A solution of the residue in 450 ml. of ether and 300 ml. of toluene is then added with stirring to an excess of diphenyl cadmium reagent prepared from 14.6 g. of magnesium turnings, 62.8 ml. of bromobenzene and 60.5 g. of cadmium chloride in a mixture of 300 ml. of ether and 300 ml. of toluene. The mixture is heated gently at reflux temperature for 45 minutes and then cooled with ice and acidified with hydrochloric acid. The ether-toluene layer is washed successively with dilute hydrochloric acid, water, dilute sodium hydroxide, water and saturated sodium chloride solution; the alkaline wash serves to remove a small amount of acidic material which is discarded. The solution is distilled to remove most of the ether and then further concentrated to dry it thoroughly. The product has the structural formula

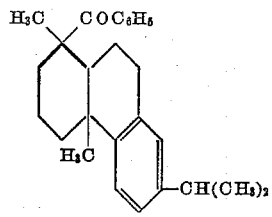

The dehydroabietophenone thus obtained is used directly in the subsequent reactions. A sample, in concentrated toluene solution, was subjected to steam distillation and yielded a non-volatile resin readily soluble in pentane. On vacuum distillation at about 185–190° C. and 0.1 mm. pressure followed by chromatography on alumina, substantially pure dehydroabietophenone was obtained as a nearly colorless stiff resin.

Example 2

A solution of 6.2 g. of the undistilled resin of dehydroabietophenone and 6 g. of aluminum isopropoxide in 150 ml. of absolute isopropanol is boiled for about 20 hours with slow distillation of the solvent through a packed jacketed column maintained at 77–78° C. The isopropanol is distilled more rapidly toward the end of the reaction until the residual volume is reduced to about 50 ml. The residue is treated with cold dilute hydrochloric acid and extracted with ether. The ether layer after washing with water and saturated sodium chloride is dried and distilled, affording a nearly colorless syrup which crystallizes partly on rubbing with pentane forming small needles. Upon repeated recrystallization from ether-pentane or heptane, needles of the α-phenyldehydroabietinol are obtained which melt at about 160–161° C. The product has the structural formula

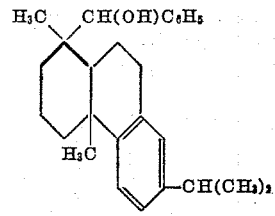

Example 3

For the preparation of larger quantities of α-phenyldehydroabietinol the following method is convenient. 200 ml. of a concentrated toluene solution of dehydroabietophenone (about 0.5 g./ml.) are mixed with a clear decantate prepared from 15 g. of aluminum turnings, a trace of mercuric chloride and 2500 ml. of isopropanol. After slow distillation of this solution for 30 to 40 hours the residue (700–900 ml.) is diluted with stirring with about 500 ml. of water, cooled internally and externally with ice, and rendered slightly acid with Congo Red, and with concentrated hydrochloric acid. This acidity is maintained while the stirred mixture is gradually diluted with 1200 ml. of water causing precipitation of about 79 g. of crude α-phenyldehydroabietinol.

Example 4

The benzoate of the α-phenyldehydroabietinol is prepared by heating for 2 hours on the steam bath of 2 g. of the phenylcarbinol with 5 ml. of benzoyl chloride in 20 ml. of pyridine. On recrystallization from a mixture of acetone and methanol the product forms rosettes of small leaves melting at about 151.5–152.5° C. after drying at 80° C. The product has the structural formula

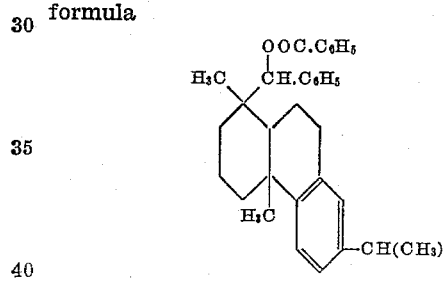

The acetate of α-phenyldehydroabietinol, similarly prepared with acetic anhydride in pyridine, crystallizes from methanol in clumps of short needles melting at about 108–109° C. after drying at 80° C.

Example 5

0.78 g. of the noncrystalline fractions accompanying α-phenyldehydroabietinol in the preparation according to the methods of Examples 2 and 3 are heated in a sealed tube with 1.5 g. of 3,5-dinitrobenzoyl chloride in 15 ml. of pyridine for 5 hours at 95° C. After treatment with water the reaction mixture is extracted with ether and the solvent layer washed successively with dilute hydrochloric acid, water, dilute sodium carbonate, water, and saturated sodium chloride. The orange oil remaining after distillation of the dried ether solution is moistened with a mixture of acetone and methanol causing crystallization of a pale yellow solid melting at 199–205° C. Upon recrystallization from a mixture of acetone and methanol and acetone alone, small medallion-shaped granules are formed which melt at 205.5–207° C. 0.96 g. of the dinitrobenzoate of the isomeric α-phenyldehydrobietinol thus obtained are saponified with 0.5 g. of sodium hydroxide in 20 ml. of methanol and 20 ml. of benzene. After concentration of the hydrolysis mixture under diminished pressure, the residue is taken up in ether and the solution is washed with water and saturated sodium chloride. The residue from the dried ether-benzene solution is then dissolved in methanol and poured with stirring into a dilute solution of sodium chloride.

The white precipitate thus formed is collected, washed and air dried. The product can be sublimated at about 90–135° C. bath temperature and 0.001 mm. pressure. The sublimate which is obtained in the form of a brittle milky glass, sinters at 45° C. and becomes mobile enough to flow at 70° C. The product has the same structural formula as that of Example 2 but is the epimer, which has the opposite configuration at the α-hydroxylated carbon atom.

A solvated isocarbinol is encountered upon saponification of the dinitrobenzoate with aqueous methanol. The dried precipitated isocarbinol is moistened with methanol whereupon the chalky powder slowly changes to a crystalline solid. This is recrystallized from methanol forming laths sintering at 52–56° C. The melting point is apparently a phase change from solvated crystals to viscous solution for one continued heating, fine bubbles form in the melt obscuring the disappearance of the last solid particles.

*Example 6*

0.17 g. of the sublimed α-phenylisodehydroabietinol are heated heated with 0.4 g. of 3,5-dinitrobenzoyl chloride in 4 ml. of pyridine in a sealed tube at 95° C. for 5 hours. The resulting dinitrobenzoate melts at about 201.5–204° C.

*Example 7*

A solution of 2 g. of α-phenyldehydroabietinol acetate in 30 ml. of acetic acid is mixed with 6 ml. of a solution (0.25 g./ml.) of chromic anhydride in 80% acetic acid and allowed to stand 6 hours at 30–35° C. After dilution of the oxidation mixture with water containing a little sodium sulfite, the precipitated solid product is collected. It is saponified with 0.5 N aqueous methanolic sodium hydroxide and on repeated crystallization from methanol forms thin needles melting at about 207.5–210.5° C. The α-phenyl-9-oxodehydroabietinol thus obtained has the structural formula

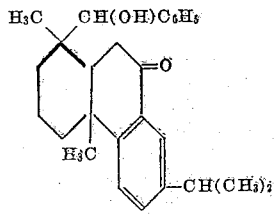

*Example 8*

With 3,5-dinitrobenzoyl chloride, α-phenyl-9-oxodehydroabietinol forms the dinitrobenzoate which separates from methanol in very fine needles which melt at about 185–202° C. with considerable sintering.

A dinitrophenylhydrazone is obtained by heating 1 g. of α-phenyl-9-oxodehydroabietinol with 0.6 g. of 2,4-dinitrophenylhydrazine in methanol containing a small amount of acetic acid in a sealed tube for 19 hours at 125–130° C. There is obtained a mixture of orange-red needles of unreacted hydrazine and of red-brown platelets of the hydrazone. The latter, on recrystallization from a mixture of methanol and chloroform, forms very thin vermillion needles which melt at about 259° C. with decomposition.

*Example 9*

2 g. of methanol solvated α-phenylisodehydroabietinol are fused at 70° C. in a stream of dry nitrogen. The resulting anhydrous resin is heated on the steam bath for 2 hours with 5 ml. of acetic anhydride and 4 ml. of pyridine. The product is taken up in ether and the washed ether solution is dried over anhydrous sodium sulfate, filtered and evaporated. The residue is dissolved in 20 ml. of methanol and poured into 200 ml. of stirred cold water containing a small amount of sodium chloride. The resulting white precipitate is collected on a filter and washed with water.

1 g. of this acetate of α-phenylisodehydroabietinol is dissolved in 15 ml. of acetic acid and stirred at 20° C. with the addition of 2.5 ml. of a solution (0.25 g./ml.) of chromic anhydride in 80% acetic acid. After allowing the solution to stand for 6 hours at 30° C., it is diluted with water containing sodium sulfite and the precipitated epimer of α-phenyl-9-oxodehydroabietinyl acetate is saponified and washed.

*Example 10*

A solution of 0.5 g. of α-phenyl-9-oxodehydroabietinol, as obtained in Example 7, in 7 ml. of acetic acid is treated with 1 ml. of chromic acid solution as used in Example 7 and allowed to stand for 5.5 hours at 26° C. The product crystallizes from aqueous methanol in hexagonal tablets melting at about 100–101° C. This is dissolved in carbon tetrachloride and decolorized by percolation through an alumina column. The colorless residue after repeated crystallization from aqueous methanol melts at about 103–104° C. The 9-oxode-hydroabietophenone has the structural formula

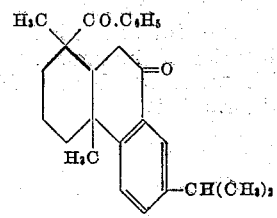

*Example 11*

0.5 g. of the epimer of α-phenyl-9-oxodehydroabietinol, obtained in Example 9, are oxidized with 0.25 g. chromic anhydride and 8 ml. of acetic acid at 22–24° C. for 5 hours. The resulting 9-oxodehydroabietophenone is recrystallized from aqueous methanol. A mixed sample with the product of Example 10 and of Example 12 gives no depression.

*Example 12*

To a solution of 8.48 g. resinous dehydroabietophenone, distilled at 185–190° C. and 0.1 mm. pressure, in 100 ml. of acetic acid a solution of 8.75 g. of chromic anhydride in 35 ml. of 80% acetic acid is added gradually at 15–20° C. After standing at 35° C. for 6 hours, the mixture is poured into 500 ml. of cold half-saturated sodium sulfate solution and the excess chromic acid is reduced with sodium sulfite. The resinous product is extracted with ether and the extract washed successively with water, dilute sodium carbonate, water and saturated sodium chloride. The bright yellow oil remaining after distillation of the ether crystallizes from a mixture of carbon tetrachloride and hexane. Decolorization by percolation through an alumina column yields pure 9-oxodehydroabietophenone melting at about 103–104° C.

*Example 13*

Crystalline methyl 6-hydroxydehydroabietate (L. F. Fieser and W. P. Campbell, J. A. C. S., 61, 2532; 1939; W. P. Campbell and M. Morgana, ibid., 63, 1841; 1941) melting at 156.5–157.5° C. is saponified with 25% methanolic potassium hydroxide and the amorphous acid, precipitated by acidification of the diluted alkaline solution with hydrochloric acid, is collected, washed and dried at 50° C. The acid is acetylated with acetic anhydride in pyridine and the washed and dried product is obtained in the form of an amorphous powder by pouring its methanol solution into stirred cold water containing a little sodium chloride. This crude acetoxy acid is converted to the 6-acetoxy-dehydroabietyl chloride with thionyl chloride as in Example 1. A solution of this chloride (prepared from 6.17 g. crystalline methyl 6-hydroxy-dehydroabietate) in a mixture of ether and toluene is then added to the diphenyl cadmium reagent prepared from 1 g. of magnesium, 4.4 ml. of bromobenzene and 4 g. of cadmium chloride. After warming the reaction mixture for one hour, the product is cooled with ice and acidified with hydrochloric acid. The ether-toluene layer is washed successively with dilute hydrochloric acid, water and saturated sodium chloride solution. The solution is distilled to remove most of the ether and then steam distilled to remove toluene and diphenyl. The solid residue is saponified by refluxing for one hour with 100 ml. of methanol containing 10 ml. of 50% aqueous potassium hydroxide after which the diluted alkaline solution is poured into an excess of cold hydrochloric acid. The resulting precipitate is crystallized from aqueous methanol from which it separates in small leaves melting at about 155–156.5° C. Repeated crystallization raises the melting point to about 160.5–161.5° C. Another modification of the same diketone can be obtained which melts at about 168.5–170.5° C. The structural formula is

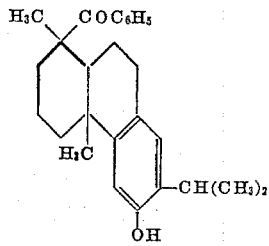

*Example 14*

3.8 g. of 6-hydroxydehydroabietophenone and 6 ml. of acetic anhydride in 10 ml. of pyridine are heated on the steam bath for 2 hours. The resulting 6-acetoxydehydroabietophenone, recrystallized from methanol, forms glistening leaves which melt at about 162.5–163.5° C.

*Example 15*

0.42 g. of 6-hydroxydehydroabietophenone are suspended in 10 ml. of 25% sodium hydroxide. The suspension is stirred and maintained at 70–80° C. during the portionwise addition of 2 ml. of dimethyl sulfate. The 6-methoxydehydroabietophenone is recrystallized from methanol and melts at about 134.5–136.5° C.

*Example 16*

A cold stirred suspension of 1.05 g. of 6-acetoxydehydroabietophenone in 15 ml. of acetic acid are treated with 2.5 g. of chromic anhydride in 10 ml. of 80% acetic acid. After addition of the oxidant the mixture is allowed to stand for 3.5 hours at 30° C. and diluted with water. 1.08 g. of the crude 6-acetoxy-9-oxodehydroabietophenone is refluxed for 30 minutes with 5 ml. of 25% aqueous sodium hydroxide in 50 ml. of methanol. The hydrolysis mixture is diluted with water and acidified with dilute hydrochloric acid. The 6-hydroxy-9-oxodehydroabietophenone is crystallized from acetone or a mixture of acetone and methanol yielding needles melting at about 233.5–236.5° C. The larger needles decrepitated explosively on vacuum drying. The product has the structural formula

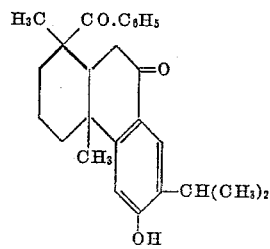

*Example 17*

A solution of 1 g. of 6-hydroxy-9-oxodehydroabietophenone is heated with 1.5 ml. of acetic anhydride in 3 ml. of pyridine on the steam bath for 2 hours. The acetate is crystallized from aqueous methanol and dried at 80° C. The leaves of the 6-acetoxy-9-oxodehydroabietophenone melt at about 114–115.5° C.

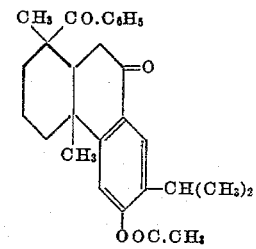

*Example 18*

0.15 g. of 6-hydroxy-9-oxodehydroabietophenone are suspended in 8 ml. of 25% sodium hydroxide and shaken at 50–60° C. with 2 ml. of dimethyl sulfate in 0.25-ml. portions. The product crystallizes from aqueous methanol in leaves melting at about 125.5–127.5° C. after drying at 80° C. The 6-methoxy-9-oxodehydroabietophenone has the structural formula

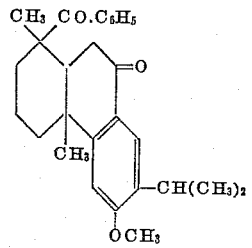

*Example 19*

A solution of 0.15 g. of 6-hydroxy-9-oxodehydroabietophenone in methanolic hydroxylamine is heated in a sealed tube at 100° C. for 3 hours. The resulting oxime crystallizes from aqueous methanol in short rods melting at about 234–238° C. with decomposition, the melt effervescing and becoming dark red in color.

I claim:

1. The 1,4a - dimethyl - 1 - arylmethanol-7-isopropyl - 1, 2, 3, 4, 9, 10, 1a, 4a - octahydrophenanthrenes of the structural formula

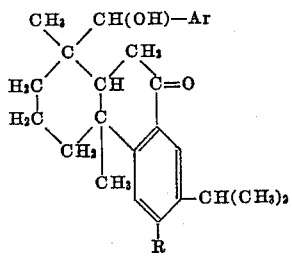

wherein R is a member of the class consisting of hydrogen and hydroxyl radicals and Ar is a monocyclic aromatic hydrocarbon radical containing six to eight carbon atoms.

2. α - Phenyl - 9 - oxodehydroabietinol of the structural formula

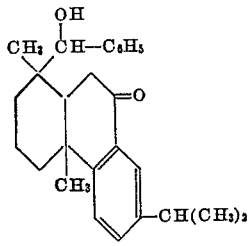

3. 6 - hydroxy-α-phenyl-9-oxodehydroabietinol of the structural formula

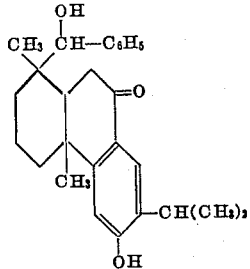

4. The process of preparing the compounds of the structural formula

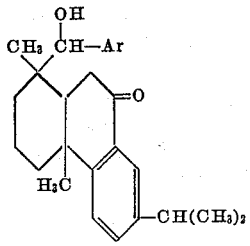

wherein Ar is a monocyclic aromatic hydrocarbon radical containing six to eight carbon atoms radical which comprises oxidizing with chromic acid in the range of 10–60° C. a compound of the type

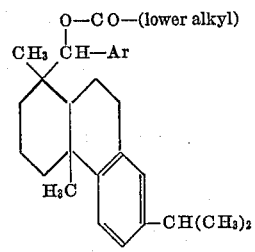

5. The process of preparing α-phenyl-9-oxodehydroabietinol which comprises oxidizing α-phenyldehydroabietinyl acetate with chromic acid at a temperature between 10° C. and 60° C.

ROBERT P. JACOBSEN.

References Cited in the file of this patent

Zeiss, Jr., Amer. Chem. Soc., vol. 70, pp. 858–860.